United States Patent Office 3,634,218
Patented Jan. 11, 1972

3,634,218
PROCESS FOR THE RADIATION GRAFTING OF BUTADIENE AND OTHER CO-GRAFT MONO-MERS ONTO POLYOLEFIN SUBSTRATES
Masao Gotohda, Kunio Araki, Shigeoshi Imamura, and Sadami Shibabe, Takasaki-shi, Japan, assignors to Japan Atomic Energy Research Institute
No Drawing. Filed Oct. 31, 1967, Ser. No. 679,523
Int. Cl. C08f 15/00; C08d 1/00
U.S. Cl. 204—159.17                                    2 Claims

ABSTRACT OF THE DISCLOSURE

A process in which a polyolefin is brought into contact with butadiene and styrene and/or acrylonitrile in the gaseous or liquid phase, either during or subsequent to irradiation of the polyolefin with an ionizing radiation whereby graft polymerization of the butadiene and co-graft monomer is effected onto the polyolefin.

BACKGROUND OF THE INVENTION (1) Field of the invention

The present invention relates to the production of plastic materials which have improved impact resistance and tensile strength and which are obtained by graft-polymerizing butadiene and either or both of styrene and acrylonitrile onto a polyolefin.

(2) Description of the prior art

Materials produced by graft-polymerizing butadiene onto a polyolefin are already known. Usually, the graft polymerization of such materials is effected by irradiation γ-rays from a Co-60 source. However, in said prior art processes the reaction rate is low and prolonged irradiation is required in order to attain the desired per cent graft (degree of graft polymerization). Moreover, because of the prolonged irradiation, cross-linking takes place which lowers the thermal fluidity (plasticity) of the graft polymer and, as a result, extrusion or injection molding of the product is made difficult.

Materials produced by graft-polymerizing styrene or acrylonitrile onto a polyolefin are also known, but such graft polymers are hard and brittle. Also, in said prior art processes substantial amounts of homopolymeric styrene or acrylonitrile are produced; and complicated procedures are required for their removal.

SUMMARY OF THE INVENTION

The present inventors studied the possibility of combined graft polymerization of butadiene and styrene and/or acrylonitrile onto a polyolefin, and found that plastic materials having superior properties can be obtained.

When styrene or acrylonitrile is co-graft-polymerized together with butadiene onto a polyolefin, the graft polymerization proceeds at a reaction rate 20 times as great as that when only butadiene is graft-polymerized, with the result that a large amount of material can be treated in a relatively short time. Furthermore, the resulting product has both impact resistance provided by the grafting of the butadiene and tensile strength provided by the grafting of the styrene or the acrylonitrile. There is no reduction of tensile strength as in the conventional butadiene-grafted polyolefin. Accordingly, the above-mentioned defects of the single graft polymerization are eliminated.

In the process of the present invention, the affinity of butadiene to polyolefin is increased by the addition of styrene or acrylonitrile, whereby uniform graft polymerization of butadiene is promoted, which causes an increase in the reaction rate and improved effects in the properties of the product.

Similar effects and products can be obtained by co-graft polymerizing the three components, butadiene, styrene and acrylonitrile onto a polyolefin in the same manner.

In one aspect of the present invention, a polyolefin which has been impregnated with a pre-determined amount of styrene-butadiene solution or acrylonitrile-butadiene solution, or a mixture of both solutions, is irradiated with an ionizing radiation in a vacuum, or in air, or in an atmosphere of a vapor of butadiene or the mixed monomers, etc. This method is effective to reduce the processing time for the subsequent reaction and to eliminate procedures required for separating unreacted monomers.

In the conventional polymerizations or graft polymerizations, it is necessary to remove oxygen completely by a freezing evacuation or by flushing the reaction system with pure nitrogen before starting the reaction, that is before or after the addition of monomers, since these reactions are very sensitive to the inhibiting action of oxygen. A commercial advantage of this invention is that oxygen is automatically removed from the reaction system by the butadiene vapor, and the reaction can be started without any special care.

Another advantage of the present invention is that only a small dose of radiation is necessary to carry out graft polymerization. Thus, the thermal fluidity (plasticity) of the product is not greatly reduced, and therefore it can be molded or fabricated in the same way as ordinary polyolefins.

Still an other advantage of this process is that the formation of homo-polymers is far less than in the conventional single graft polymerization of acrylonitrile or styrene, because of the synergistic effects of each or both of the above two components and butadiene. Accordingly, no special procedure for separation of the produced homo-polymers is necessary. In particular, the above effects are remarkably exhibited in a gaseous phase reaction by pre-irradiation.

Still an other advantage is that it is easy to vary the composition of the gaseous mixture of acrylonitrile or styrene and butadiene and therefore variation in the composition of the graft polymer to be produced can easily be effected. Consequently, the physical properties of the graft polymer product, such as tensile strength, impact resistance, etc. can be optionally controlled.

Still another advantage is that more delicate control of properties of the product can be achieved by a co-graft polymerization of the three monomers: acrylonitrile, styrene and butadiene.

The produced graft polymer retains double bonds, so it can be vulcanized with sulfur or peroxides, and the resulting cross-linking brings about remarkable improvement in impact resistance.

The process of this invention is carried out by contacting a polyolefin, which has been activated by pre-irradiation with an ionizing radiation in an atmosphere of air, butadiene vapor, nitrogen or argon, with butadiene, styrene and/or acrylonitrile in vapor phase or liquid phase; or by activating a polyolefin by means of an ionizing radiation in the presence of butadiene and acrylonitrile or butadiene and styrene or a mixture of the three in vapor phase or liquid phase.

It is possible as a modification of the process of this invention to carry out the reaction by means of the so-called after-effect polymerization, that is to say, after a polyolefin is irradiated by an ionizing radiation in the presence of acrylonitrile-styrene in vapor or liquid phase and butadiene in vapor phase, polymerization is further continued for a pre-determined period.

Also, it is possible to control the velocity of graft polymerization by addition of a solvent such as acetone, methanol, benzene, ethanol, xylene, chloroform, carbon tetrachloride, tetrahydrofuran, etc.

Specific conditions of the reaction are given below. The polyolefin is irradiated with $10^4$–$10^7$ rads. (total dose) of an ionizing radiation (corpuscular rays such as neutron rays, electron beams, $\beta$-rays, $\alpha$-rays, etc. and electromagnetic waves such as X-rays, $\gamma$-rays, etc.).

As the radiation dose increases, the velocity of the graft polymerization increases, but the thermal fluidity of the graft polyolefin becomes lower as a result of the formation of cross-linking. In general, the preferred total dose is about 2M rads. It is desirable to treat irradiated polyolefin without delay after the irradiation, but even 3 hours after the irradiation, the reaction ability is retained and as much as 80% of the yield can be obtained as compared to when reaction is effected immediately after irradiation.

When acrylonitrile or styrene is graft-polymerized in the gaseous phase, butadiene saturated with a vapor of acrylonitrile or styrene at a particular temperature can be easily prepared by bubbling butadiene into liquid acrylonitrile or styrene, and the thus obtained vapor mixture is brought into contact with the irradiated polyolefin. For acrylonitrile, the vapor pressure of which is high; the vapor mixture of acrylonitrile-butadiene is easily produced at 0°–100° C. For styrene, the vapor pressure of which is rather low, it is preferable to produce the vapor mixture at 20–100° C.

The higher the reaction temperature, the easier the graft polymerization. At temperatures as low as about $-30°$ C., though a high percent grafth (degree of graft polymerization is achieved, the reaction rate is too low. On the other hand, when the temperature is too high, the once activated radicals are easily deactivated, so the preferred reaction temperatures are between 30° C. and 120° C.

As the reaction period is lengthened, the percent graft (degree of graft polymerization) become higher. The preferred percent graft is 5–200%, within which a desirable modification of the properties are effected, such a percent graft is achieved in 5 minutes to 6 hours.

When an acrylonitrile-styrene mixture is reacted in the liquid phase, the reaction velocity is even higher. Graft polymerization can also be carried out by contacting butadiene vapor with a polyolefin having been wetted with liquid acrylonitrile or a polyolefin impregnated with acrylonitrile or styrene. In these cases, the reaction temperature are between 30° C. and 120° C., and the preferred degree of grafting, 5–200%, is achieved in 5 minutes to 3 hours. If a polyolefin is impregnated with a predetermined amount of acrylonitrile or styrene to be grafted before irradiation, the reaction period is shortened and the treatment of the produced graft polymer is simplified.

DETAILED DESCRIPTION

The invention is next illustrated by way of the following examples.

EXAMPLE 1

Starting materials

Polyethylene—Pellets produced by low pressure polymerization process, having a molecular weight of 3,400 (Hi-Zex 1100 J (RTM) of Mitsui Chem. Ind. Co., Ltd.).
Butadiene—Oxygen-free commercial product.
Acrylonitrile—Commercial product washed with aq. NaOH, dried, and distilled.

The polyethylene was irradiated in air with 2M rads (2 Mev., 1 ma. for 10 sec.) of an electron beam from an electron accelerator. Butadiene vapor was dried with soda lime and was bubbled in acrylonitrile at 20° C. to produce a saturated vapor mixture of butadiene-acrylonitrile. The vapor was introduced into an aggregate of irradiated polyethylene pellets kept at 50° C. A purge of oxygen before the reaction was unnecessary, because the reaction system was freed from oxygen by passing of the vapor mixture.

After the reaction, the polyethylene pellets were dried and weighed. A graft polymer having obtained a 10% graft was produced in 1 hour of reaction and one having a 20% graft was produced in 3 hours. An elemental analysis confirmed that the butadiene and acrylonitrile were grafted in the ratio of 2:1.

EXAMPLE 2

The same polyethylene as used in Example 1 was irradiated with 2M rad. of the electron beams from the electron accelerator for 10 sec. Butadiene gas was bubbled in liquid styrene at 60° C. and the thus produced butadiene-styrene vapor mixture was contacted with the irradiated polyethylene at 75° C. A graft polymer was obtained having a 9% degree of polymerization in 1 hour, and one having a 15% degree of grafting was produced in 3 hours.

EXAMPLE 3

Polyethylene pellets produced by a low pressure process and having a molecular weight of 85,000 were irradiated with 2M rad. of an electron beam from an electron accelerator for 10 sec. The irradiated polyethylene was immersed in styrene at 60° C. and butadiene gas was bubbled in the styrene.

A graft polymer having attained a 12% graft was produced in 15 minutes and one having attained a 20% graft was produced in 40 min.

EXAMPLE 4

The same polyethylene used in Example 1 was impregnated with styrene and irradiated with 2M rads. of an electron beam from an electron accelerator while in contact with a flow of butadiene gas for 10 seconds at room temperature. The reaction was continued after the irradiation, and a graft polymer having a 6% graft was obtained in 5 min. and one having a 20% graft was produced in 15 min.

EXAMPLE 5

Butadiene was bubbled in acrylonitrile at 20° C. to form a vapor mixture. The vapor mixture was contacted with the same polyethylene as used in Example 1 at 30° C. and irradiated with $\gamma$-radiation from Co-60 (dose rate $1\times10^6$ R/hr.) for 1 hour. A graft polymer having a 5% graft was obtained in 1 hour and one having a 23% graft was produced in 2 hours, and one having a 45% graft was produced in 3 hours.

EXAMPLE 6

A polypropylene powder (molecular weight 100,000) was irradiated in air with $\gamma$-radiation from Co-60 of 7,000 curies (dose rate $1.6\times10^6$ R/hr.) for 2 hours. Subsequently, butadiene gas was bubbled in styrene at 70° C. and the thus produced vapor mixture was contacted with the polypropylene powder for graft polymerization at 75° C. for 1 hour. A graft polymer having a 15% graft was obtained in 1 hour and one having a 30% graft was obtained in 2 hours.

EXAMPLE 7

The polypropylene (the same as used in the above Example 6) was immersed in styrene and thereafter, was irradiated with $\gamma$-radiation from Co-60 (dose rate $1.6\times10^6$ R/hr.) for 30 min. while butadiene was passed thereover. A graft polymer having a 20% graft was obtained after 30 min. of reaction and one having a 50% graft was obtained after 2 hours.

EXAMPLE 8

The same polyethylene as used in Example 1 was first irradiated with $\gamma$-radiation from Co-60 (dose rate $1 \times 10^6$ R/hr.) for 4 hours in the presence of butadiene gas. Immediately after the irradiation, the irradiated polyethylene was immersed in styrene, while contact with oxygen was prevented. A graft polymer having a 33% graft was obtained after the reaction for 3 hours at 40° C.

EXAMPLE 9

The same polyethylene as used in Example 1 was irradiated with 10M rads of an electron beam. Then, butadiene gas was bubbled in a liquid mixture consisting of 20 volume parts of acrylonitrile and 80 volume parts of styrene, and the resulting acrylonitrile-styrene-butadiene vapor mixture was brought into contact with the polyethylene.

After reaction for 30 min. at 70° C., there was obtained a graft polymer having a 15% graft. A polymer having a degree of grafting 50% was obtained in 2 hr.

The physical properties of the thus obtained graft polymers (modified polyethylenes) are shown in the following table.

| Graft polymer | Percent graft | Impact tensile strength (kg. cm./cm.²) | Tensile strength (kg./cm.²) |
|---|---|---|---|
| PE (Hi-Zex 1100J [non-grafted]) | | 31 | 325 |
| PE—(BD, St) | 10 | 120 | 300 |
| PE—(BD, St) | 20 | 98 | 330 |
| PE—(BD, St) | 30 | 80 | 350 |
| PE—(BD, AN) | 10 | 150 | 290 |
| PE—(BD, AN) | 20 | 110 | 325 |
| PE—(BD, AN, St) | 20 | 100 | 350 |

NOTE.—PE: Polyethylene; BD: Butadiene; St: Styrene; AN: acrylonitrile; Matter in parentheses following PE referes to the co-graft monomers with the polyethylene.

In the above examples, the ionizing radiation was shown only as γ-rays from Co-60 and electron beams. However, other ionizing radiation may also be employed, such as neutron beams, proton beams, γ-rays, X-rays, etc.

Also, although pellets of polyethylene and powders of polypropylene are used in the above examples, the processes can also be applied to polyolefins in the form of films, yarns, or knitted fabrics.

What is claimed is:

1. A process for graft polymerization onto a polyolefin, said process comprising impregnating the polyolefin with a co-graft monomer substance selected from the group consisting of styrene, acylonitrile and mixtures thereof, irradiating the thusly impregnated polyolefin with an ionizing radiation and contacting the impregnated, irradiated polyolefin with butadiene.

2. A process as claimed in claim 1 wherein said ionizing radiation is in a dose of $10^4$–$10^7$ rads.

References Cited
UNITED STATES PATENTS

| | | | |
|---|---|---|---|
| 3,366,560 | 1/1968 | Yoshitake et al. | 204—159.15 |
| 3,252,880 | 5/1966 | Magat et al. | 204—159.17 |
| 3,066,085 | 11/1962 | Smith et al. | 204—159.17 |

MURRAY TILLMAN, Primary Examiner

R. B. TURER, Assistant Examiner

U.S. Cl. X.R.

260—877, 878 R, 878 B